United States Patent [19]

Parks

[11] Patent Number: 4,866,424
[45] Date of Patent: Sep. 12, 1989

[54] METAL DETECTOR COIL

[75] Inventor: Stephen I. Parks, Derwood, Md.

[73] Assignee: EG&G Astrophysics Research Corporation, Wellesley, Mass.

[21] Appl. No.: 142,632

[22] Filed: Jan. 11, 1988

[51] Int. Cl.$^4$ ............................................. G08B 13/24
[52] U.S. Cl. .................................. 340/551; 324/243; 340/572
[58] Field of Search ............... 340/551, 572; 324/260, 324/243

[56] References Cited

U.S. PATENT DOCUMENTS

| | | | |
|---|---|---|---|
| 2,735,980 | 2/1956 | Wait | 324/239 X |
| 3,697,996 | 10/1972 | Elder et al. | 324/260 |
| 3,758,849 | 9/1973 | Susman et al. | 324/243 X |
| 3,765,007 | 10/1973 | Elder | 340/572 |
| 4,012,690 | 3/1977 | Heytow | 324/243 |
| 4,024,468 | 5/1977 | Hirschi | 324/243 X |
| 4,539,558 | 9/1985 | Fearon | 340/572 |
| 4,605,898 | 8/1986 | Aittoniemi et al. | 324/243 X |
| 4,654,641 | 3/1987 | Ferguson et al. | 340/572 |

Primary Examiner—Glen R. Swann, III
Assistant Examiner—Thomas J. Mullen, Jr.
Attorney, Agent, or Firm—Louis Bernat

[57] ABSTRACT

A coil for a metal detector is constructed from a ribbon cable having a plurality of spaced parallel conductors. The ribbon is formed into a loop where its opposing ends confront each other. The conductors are joined in an off-set manner at the end of the cable to form a single conductor into a loop. Various configurations of coil placement are shown to compensate for various external disturbances such as nearby metal objects, for example.

12 Claims, 6 Drawing Sheets

COIL WINDINGS OF
PRIOR ART

A PREFERRED EMBODIMENT OF NEW RECEIVER COIL SET

ELECTRICAL CONNECTIONS OF DUAL RECEIVING COILS WITH ASSOCIATED ELECTRONICS

FIG.7

FIG.13 CONNECTION OF COILS OF FIG.7

FIG.12A  FIG.12B

HOW COILS OF FIG.2 ARE CONNECTED IN THE CIRCUIT

FIG.11

TRANSMITTING COILS IN ONE EMBODIMENT OF INVENTIVE SYSTEM

FIG. 14
(PRIOR ART)

SHOWS SENSITIVITY CONTOURS FOR TYPICAL PRIOR ART METAL DETECTOR ARRAY. THE FIG. REPRESENTS THE SENSITIVITY TO OBJECTS LOCATED IN A HORIZONTAL PLANE AT A HEIGHT OF ABOUT 50 CM

FIG. 15

SHOWS SENSITIVITY CONTOURS FOR INVENTIVE METAL DETECTOR DESIGN FOR COIL 80 OF FIG 6 AT A HEIGHT OF ABOUT 120 CM

FIG. 16

SHOWS IMPORTANCE OF ANGLE INTERSECTION OF FLUX FROM EXCITATION ARRAY WITH SENSITIVITY LINES OF RECEIVER ARRAY. WHERE LINES INTERSECT AT RIGHT ANGLES, COUPLING VIA AN ISOTROPIC OBJECT WILL BE WEAK

FIG. 17

SHOWS HOW DIFFERENT FIELD PATTERN CAN CHANGE ANGLE OF INTERSECTION AND THUS IMPROVE COUPLING VIA CONTRABAND METAL.

METAL DETECTOR COIL

This invention relates to coils and, more particularly, to loosely coupled coils which are especially—but not exclusively—well adapted to use in metal detectors.

Metal detectors of the type which may use the inventive coils are commonly found in airports and other public buildings, for example, to detect persons who may be carrying concealed weapons. A common problem with this type of detector is that it cannot always distinguish between contraband metal (weapons) and background clutter such as coins or keys which are in a pocket. Moreover, the prior art does not purport to solve the problems of field distortion due to proximate metal outside the inspection zone. Thus, a common failing of these systems is their susceptibility to external noise which limits the effective sensitivity. Heytow (U.S. Pat. No. 4,012,690) claims to counterbalance external metal effects with a vane in one of the side panels to mechanically produce a countermeasure effect.

Electromagnetic investigation of materials by means of systems using coils has been available for many years. These systems have been used in activities such as exploration for mineral ores, searches for military purposes, treasure hunting, food testing for metal particles, and searches for weapons at airports and other high-risk installations. Almost all such systems which describe coil structures are directed to problems which are peculiar to a specific system.

Hirschi (U.S. Pat. No. 4,024,468) teaches a system of coplanar coils for a portable treasure finder where the electromechanical field disturbance in the system is essentially within the physical dimensions of the coil system. Wait (U.S. Pat. No. 2,735,980) describes a method for mineral prospecting. Recently, I. J.. Won of North Carolina State University described a wideband system in "Development of a Prototype Sweep-Frequency EM Exploration System" which relates to a vehicular system carrying coils to prospect for shallow mineral deposits.

In the field of detecting contraband objects carried on one's person, Barringer (U.S. Pat. No. 3,430,221) describes coils. Brown (U. S. Pat. No. 3,697,996,) introduces divergent field eddy current generation using multiple coils in a detection system. Susman (U.S. Pat. No. 3,758,849) uses transmitter and receiver coils which are crossed at angles with respect to each other in a bistatic continuous-wave system. A detector system is bistatic if the system has transmitter coils on one side of the sensitive volume and receiver coils on the other side. The prior art reference to Susman, skews the fields to make the metal detector less likely to miss contraband if the contraband article is misaligned with the fields in the detector. Susman teaches intentionally positioned orthogonal fields.

The word "skewing" means construction or orientation of coils in such a way as to cause a change in the direction of minimum sensitivity as an object is moved to a different location in the field.

Elder, et al, (U.S. Pat. No. 3,697,996) describe a system using multiple coil shapes, including overlapped coplanar coils, to make divergent orthogonal fields at different times. The disclosed Elder, et al. coils are not directed to a use in contraband metal detectors.

Aittoniemi (U.S. Pat. No. 4,605,898) teaches polarization diversity by providing two complete sets of coil elements, including a pair of independent transmitter coil arrays on one side, and a mirror-image pair of receiver coil arrays on the opposite side of a portal, effectively constituting two metal detectors in a bistatic portal. The two coil arrays are laid out at different angles in order to achieve some polarization diversity. It is thought that this use of a matched mirror-image arrangement improves performance.

A goal of metal detector coil array designs is to provide constant sensitivity to metal objects for all paths and orientations of a potential contraband object which may be carried through the portal. High uniformity or homogeneity of the magnetic field permits effective discrimination between weapons and innocuous metal items on the basis of amplitude alone. Weapons tend to produce stronger signals than miscellaneous small metal items, such as keys or jewelry. The achievable homogeneity of the magnetic field is generally quite poor in prior art portal-type metal detectors. However, the inventive metal detector coil array design used in the inventive walk-through portal-type metal detector substantially improves the homogeneity of the magnetic field and the overall variation of the field strength approaches a ratio of about 4:1.

If the metal detector environment is substantially free of noise, known coil designs may accommodate large pieces of moving metal, such as a large-caliber handgun which is within a portal area. These coils exhibit local changes in apparent sensitivity when operated next to metal furniture or over metal-reinforced floors. A careful examination of the detection sensitivity of such system reveals areas in the portal cross-section where the sensitivity is much lower or higher than optimum. One reason for this is that prior coils have been constructed from tightly bundled packets of wire. Such bundling creates regions of extreme sensitivity, called hot spots, at small radial distances from the wire bundles. These hot spots can cause a nuisance alarm if, for example, a small object such as a wristwatch passes through a region.

Tight bundling of the coil wires also causes an unnecessary increase in both intrawinding capacitance and coil inductance, both of which significantly increase the response time and hence reduce the sensitivity to small objects. Accordingly, an object of this invention is to provide new and improved coil structures and, more particularly, to provide transmitter and receiver coils for detecting contraband metal being carried through a protected area.

Another object of the invention is to provide new distributed coil structures with reduced hot spots and with shorter transmitter and receiver time constants.

Still another object of the invention is to provide different receiver coil patterns which greatly reduce sensitivity to spatially curved magnetic interference fields, as well as to signals from moving metal which is outside the active detection area.

Yet a further object of the invention is to provide switchable transmitter coils for accommodating various types of metal objects at floor level.

A still further object of the invention is to provide coils in a plurality of separate panels, which may be easily disassembled, stacked and packed for easy transportation.

Another object of the invention is to provide a vertically stacked array of coplanar coils to provide a narrow and low array, with only a slight, if any, compromise of sensitivity and discrimination.

In keeping with an aspect of this invention, these and other objects are accomplished by coils made from loosely bound wires which are separated from each other by a fixed and predictable distance. Since the intervening characteristics are known, it is possible to produce an optimum design which may be provided with any compensations that are necessary. These compensations are produced by small, strategically located trimming coils. Mechanically, the receiver coils are constructed from flat ribbon conductors in which spaced parallel wires are embedded in plastic. The conductors at the opposite ends of the ribbon are brought into confrontation with each other, where they are offset from each other by a distance of one wire. Then, the confronting wire ends are joined together at the two ends of the ribbon, whereupon all of the wires become a single electrical conductor in the form of a coil. The invention includes a geometrical disposition of the coil.

Preferred embodiments of the invention as shown in the attached drawings in which.

The inventive system avoids tight bundling of the turns in the coils by providing controlled spacing of the turns. The controlled spacing provides reduction of the hot spot phenomenon.

A common problem in pulsed-field metal detectors is that small objects are difficult to detect. This is due not only to the small magnitude of the signal, but also to the time profile of the system response to the object. The signals from small conductive objects endure for only a brief time following a removal of the excitation field. For example, in order to detect about a one gram mass of copper or gold in a pulsed-field system within a portal area, which is sized for the passage of persons therethrough, it is necessary to discharge the energy of excitation within less than approximately 50 microseconds.

A walk-through metal detector may store as much as 0.02 Joules in the field which is induced by the excitation coils. A finite time is required to remove this energy at the end of the excitation pulse. For example, a removal rate of 200 watts may require 100 microseconds to extinguish the excitation signal. The inventive coil system provides a substantially more rapid discharge of the energy stored in the transmitting coil.

Figure 1:
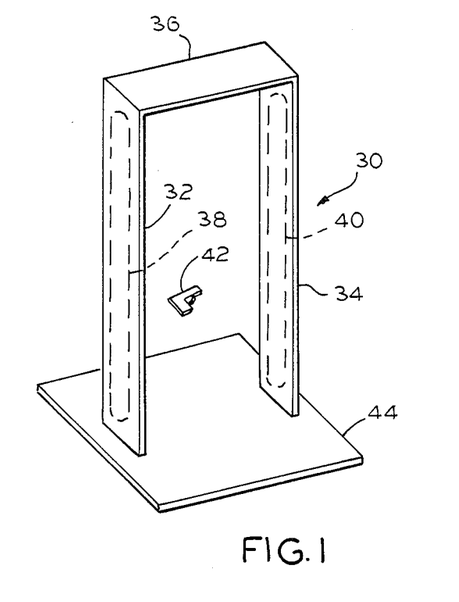
FIG. 1 is a perspective view of a portal which may incorporate the inventive coil.

FIG. 1 shows a portal 30 of a contraband metal detector system, where the tops of a spaced pair of uprights 32, 34 are jointed by a lintel-board 36. Any suitable means may hold the portal in this upright position for people to walk through. Transmitter coils 38 are supported on one of the uprights 32 and receive coils 40 are supported on the other upright. The transmitter coil 38 is pulsed at a cyclic rate to repeatedly create electromagnetic fields, which may be picked up by the receive coil 40. If contraband metal 42 is in the electromagnetic field, it is excited by the changing magnitude of the field to produce effects which modify the signals picked up by receive coil 40.

The transmit and receive coils 38 and 40, respectively, generally have had characteristics which caused problems and tended to prevent a suitably reliable discrimination between contraband metal and background clutter. Some of these problems have tended to result from tightly bound wires within the conventional coil, such as coils 38, 40. Other of the problems have occurred because the environment reflected signals, as from metal doors and furniture, for example. Still other problems have come from metal below the coils, as in the floor and its supports.

The invention solves the unpredictable wire bundling problems by a use of a flat ribbon wire cable 46 (FIG. 2), wherein a plurality of spaced parallel conductors 48, 50 are embedded in a plastic jacket. These ribbon cables were originally intended for interconnecting computing devices by mass termination with proprietary connectors, and are made by several manufacturers, including the 3M Corporation. This kind of cable is used for a different purpose here, to assure uniform placement and distribution of the windings. A wider spatial distribution decreases the self-inductance and capacitance of the windings. This decrease reduces the time constant of the receiver coils, as well as the hot spot phenomenon mentioned earlier.

Figure 2:
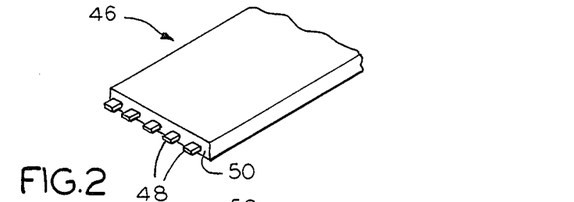
FIG. 2 is a perspective view of a ribbon cable which may be used to realize the invention.
Figure 3:
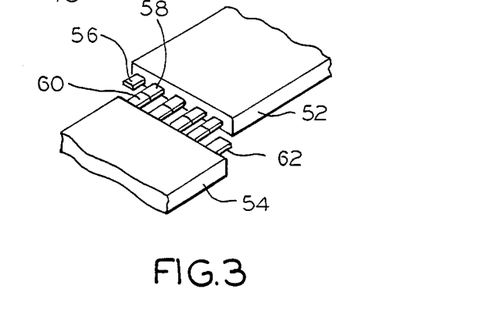
FIG. 3 is a perspective view showing confronting ends of a single ribbon cable joined to form a single coil.

This type of cable has a plurality of spaced parallel wires 48 embedded in a solid plastic jacket 50. A length of such ribbon cable 46 is formed into a rectangle, with the opposite ends of the length in confrontation. The lead wires on the two ends of the length are offset with respect to each other. Thus, the first lead wire 56 in end 52 is not connected, but is left to make an external connection. The second lead wire 58 in end 52 is connected to the first wire 60 on confronting end 54. Succeeding lead wires are interconnected, and the last lead wire 62 is used as an additional external connection.

Figure 4A:
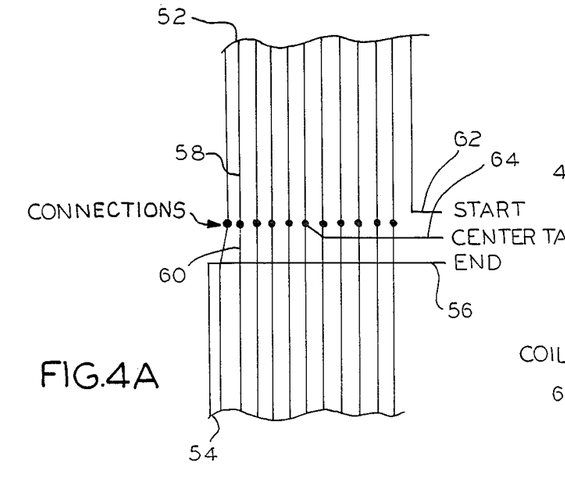
FIG. 4A schematically shows how the coils of FIG. 3 are connected to form a circuit.
Figure 4B:
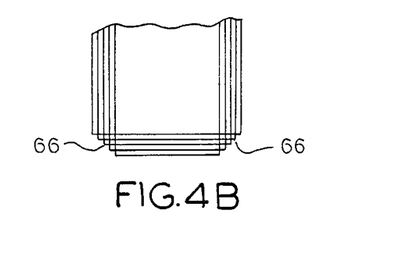
FIG. 4B schematically shows how the ribbon cable is folded to form it into a single multiturn coil of wire.

The equivalent electrical circuit is shown in FIG. 4A, where the ends 56, 62 of the coil are positioned to be connected to make external connections to associated equipment. A centertap 64 may be connected to the wire which is at the center of the coil. Thus, the coil assembly is effectively a centertapped differential device which can be advantageously connected to a differential amplifier. In a similar manner, any suitable taps may be connected to any suitable location in the coil. FIG. 4B shows the manner in which the ribbon is folded over itself at 66 to make a 90° turn. Similar folds may be made to form any other suitable corner.

The ribbon is folded at corners 66, so as to lie flat and form a neat assembly. Every turn traverses the full circumference of the coil array, and runs near a corresponding wire on the opposite side of the centertap, so that electrical displacement currents in any zone produce equal and cancelling voltages in the coil. The balance which is so achieved reduces the requirement for Faraday shielding.

Figure 5:
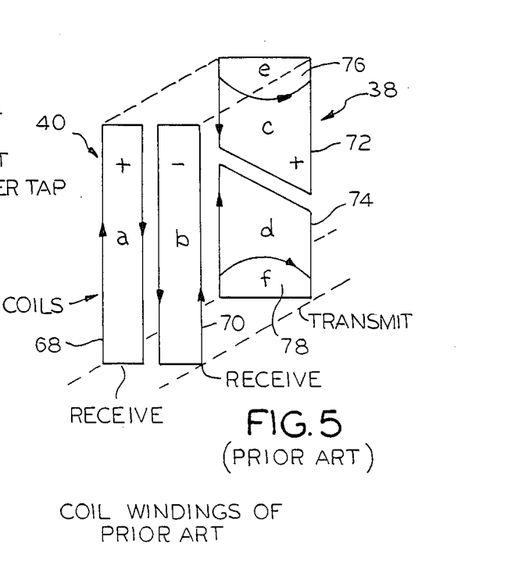
FIG. 5 shows a prior art embodiment of a receiver coil set.

Usually, the coil system 38, 40 (FIGS. 1, 5) is in the nature of two meters high, which accommodates all but the tallest persons. The transmitter coils 38 may be on one side of the portal, while the receive coils 40 are on the other side of the portal. This arrangement is called "bistatic". The vertically disposed receive coil pair 68, 70 is connected as a differential winding. A transmit coil 38 is connected to make the top and bottom coil halves 72 and 74, respectively, opposite in an electromagnetic field sense with respect to a driving pulse. Peaking coils 76 and 78 may be used at the top and bottom, to reduce the loss of field strength near the feet and head of the person in the portal.

Figure 6:
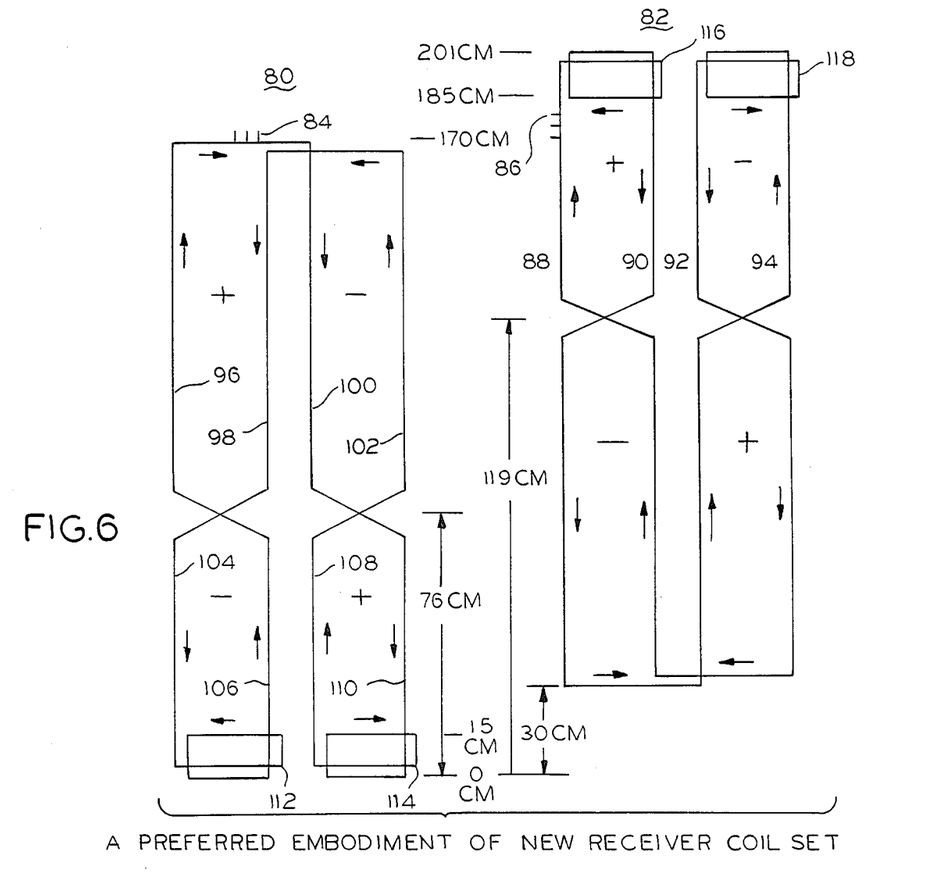
FIG. 6 schematically shows a preferred embodiment orientation of receiver coil windings at a portal.

FIG. 6 shows how the receiver coils 80 and 82 are wound in one embodiment of the inventive system. Two winding patterns of respective receiver coils 80 and 82 are shown, one, at 80, on the left side and one, at 82, on the right side of the figure. The two winding patterns of coils 80 and 82 are identical coils except that one is inverted relative to the other. The two patterns are spliced in different places 84, 86 for reasons of mechanical convenience. The patterns are shown side-by-side for clarity, but in the final assembly, the coils are superimposed so that coil segments 88, 90, 92, and 94 lie directly on top of coil segments 96, 98, 100, and 102, respectively, with a significant upward displacement. Since the design considerations and functioning of the two coils are identical, most of the following discussion refers to only the coil pattern in coil 80, on the left side of the FIG. 6.

The required field patterns are achieved by coplanar coils of different size and shape, connected in series so that currents that circulate clockwise in some coils will also circulate counterclockwise in other coils. This opposing connection relationship is symbolized in three ways in the figures. In FIG. 6, the direction of the current flow is shown by arrows. Also in FIG. 6 and in later figures, "+" and "−" symbols describe whether the current is clockwise or counterclockwise, respectively, in the loop which is so labeled. In the schematic drawings, the clockwise end of the coil (where current is injected into the coil) is labeled with a dot. The patterns, which appear as single lines on the drawing, actually consist of flat multiconductor ribbon cables, as described, and cemented down and then folded at the corners along the path of the line.

Conventional design for metal detectors places the inner vertical conductors 98, 100 and 106, 108 together in a central bundle. Our analysis shows that the gap between the left and right halves of the winding patterns of FIG. 6 have very little effect on the field strength of the coil array at a medium range—for example, of about 40 cm—where a loss of sensitivity is most critical. At ranges of approximately 10 cm or less, where there is too much sensitivity, the gap provides a very significant reduction in sensitivity. Calculations predict that the gap should be about the same width as the coils themselves. If the array extends 45 cm horizontally, each coil should be about 15 cm wide, and the coils should be separated by approximately 15 cm.

The inventive array is antisymmetrical about a vertical line bisecting the array and is also approximately antisymmetrical across a horizontal line bisecting the array. The receiver array is thus split into four equal loops, with the current sense alternating at successive positions, clockwise around the array. Such an array has no dipole or quadrupole moment. The lowest nonzero moment in an octopole. Because of this, the sensitivity to flat or gently curving external fields is very small, so that external noise sources are very weakly sensed.

Additional loops 112 and 114 are formed in each leg of the loops at the bottom of FIG. 6 and thus near the floor, as well as at the top of the loops 116 and 118, and thus near the head. These additional loops may be used as a modification in order to correct the otherwise weak regions. The placement and size of the various loops constitute an empirical compromise which provides substantially uniform sensitivity in calculations and field tests. In order to assure that the quadrupolar sensitivity of the receiver coil remains minimal, the effective additional coil area of the loops 112 and 114 is offset by increasing the lengths of the upper loops 96, 98 and 100, 102.

A detector using coil 80 alone would have two dead zones of reduced sensitivity which are at the top, where end effects dominate, and especially at the central zone where the windings cross in an "x" pattern. A weapon could pass undetected through either of these two zones of reduced sensitivity. Coil 82 gives complementary coverage at these two dead zones. Weak zones in the response of coil 80 correspond geometrically to the strongest response zones of coil 82 and vice versa. Each of the coil outputs is processed by a separate detection system shown in Applicant's co-pending application, Ser. No. 141,706, filed Jan. 7, 1988. The "ALARM" outputs of two receivers 120, 122 are passed together by OR gate 124 of FIG. 7, to yield a highly uniform coverage of the area of the detector coil. Although the centroid of coil 82 (FIG. 6) sensitivity is located higher than the centroid of coil 80 sensitivity, there is no intent or provision to identify an alarm by its place of origin.

Figure 7:
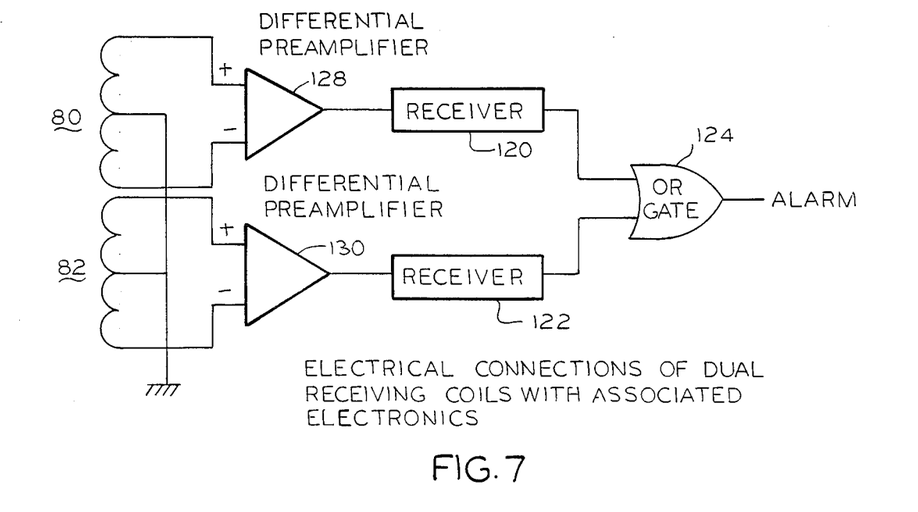
FIG. 7 is a block diagram which shows the electrical connections between the receiving coils and individually associated preamplifiers.
Figure 8:
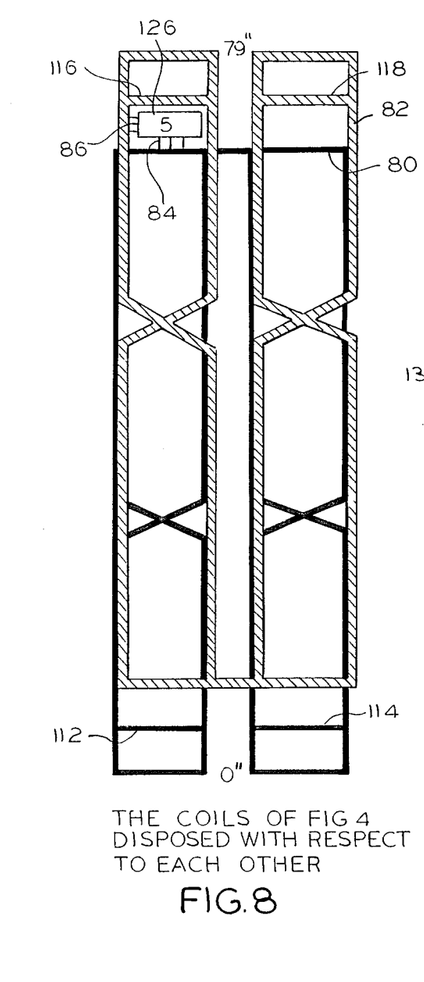
FIG. 8 is a schematic view of a plurality of coils which shows how the coils are disposed with respect to each other.

FIG. 8 shows the co-location of the two coils, encompassing overlapping areas. The hatching along the two coils 80, 82 is intended to illustrate the overlay or superposition where the front coil obstructs the view of the rearmost coil, except at the bottom. The area bounded by 126 of FIG. 8 is occupied by dual differential preamplifiers 128, 0, as shown in FIG. 7. Each preamplifier may be any suitable low-noise differential amplifier, such as part number OP-37, made by Precision Monolithics Inc., of Santa Clara, Calif. The splice 51, 52 in each coil is placed to minimize the length of wires connecting to the preamplifier.

The preamplifiers 128, 130 establish a low noise figure for the receivers by amplifying signals at the source, the amplifiers yielding a voltage gain of about 100. Since the amplified signals in the feedline are much stronger than the noise picked up in the cabling, the system is relatively immune to the noise which is picked up by the cable.

The use of a two-coil set provides a number of beneficial effects. First, using two coils with complementary coverage enables a use of an array using octopoles which have very low sensitivity to external noise fields and to large moving metal objects, because the sensitivity falls off more rapidly than the sensitivity of the more conventional quadrupole array. In particular, the geometry of the coils substantially reduces their sensitivity to metal doors. The signal from the lower half of the door, entering the lower half of the coil, is approximately cancelled by the signal from the upper half of the door, which is oppositely sensed by the upper half of the coil.

Susman et al. (U.S. Pat. No. 3,758,849) and Aittoniemi et al (U.S. Pat. No. 4,605,898) use dual transmitters and receivers in metal detectors, with the object of sensing fields in several different directions. However, the aforesaid prior art references have used quadrupole or even lower moments in their receiver array designs, so that the amount of noise that is picked up is significantly greater.

Balanced coil sets disclosed in prior art references attempted to provide elementary dipole or stacked dipole arrays (such as Susman, U.S. Pat. No. 3,758,849), but do not sector the receive coil areas to insure uniform receptor sensitivity or to nullify the dipole and quadrupole moments. Finally, in the prior art, the windings are closely bundled so that hot spots are significantly worse.

Figure 9:
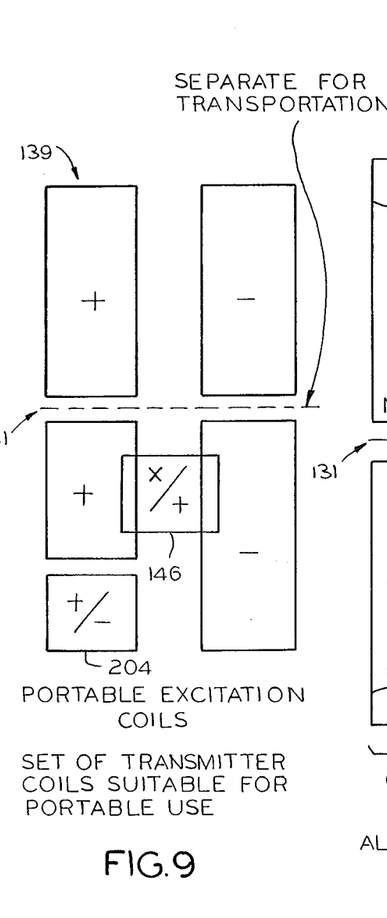
FIG. 9 schematically shows a first embodiment with portable transmitter coil sets.
Figure 10:
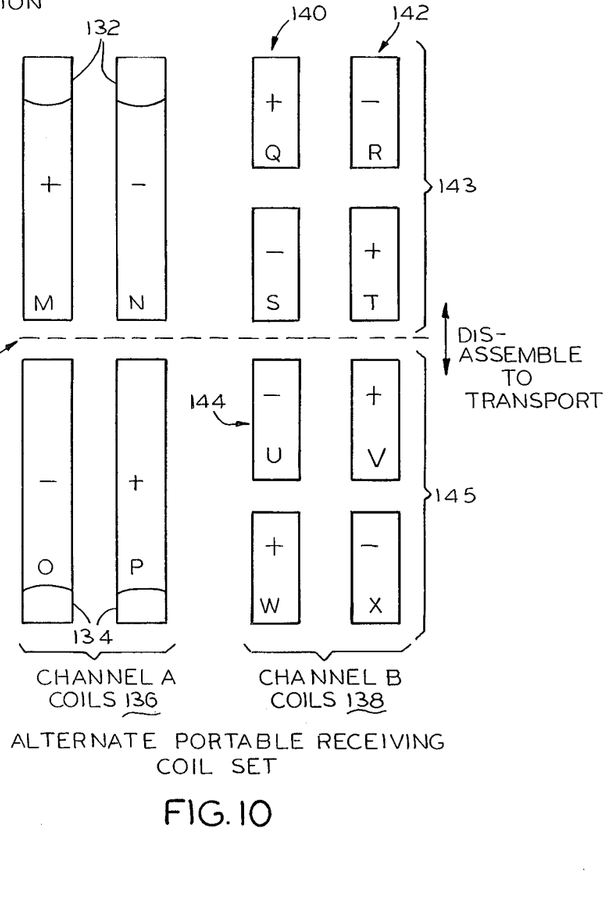
FIG. 10 schematically shows a set of receiver coils which are suitable for use with an embodiment which is portable.

Many detection tasks require convenient portability. For example, the system may be shipped as checked baggage on commercial airlines. FIGS. 9, 10 show embodiments which are appropriate for such a portable detector. The coil designs have been altered slightly to provide for splitting the panels on both the transmitter coil and the receive coil sides 38, 40 of FIG. 1 into two smaller panels, each panel being just over a meter long. The entire system, including the electronics, may be packaged and transported as three baggage-sized items.

In the portable system and for mechanical reasons, it is convenient to alter the receive coil 40 arrays shown FIG. 10. One of the coil assemblies takes a form which is similar to one of the octopole coils of FIG. 8; however, it extends over the full height of the array (FIG. 10). The coil separation and crossover 131 coincides precisely with the vertical halfway mark. Booster coils 132, 134 are added at both ends. The other coil is a hexadecapole, consisting of two octopole structures 80, 82, one on each panel, with the octopoles 80, 82 connected in opposite senses. The array 136 is weak at half-height while the array 138 is weak at one-fourth and three-fourths heights. Connected as before to two receiver electronic systems, which are coupled together, the combination yields a substantially uniform sensitivity. Transmitter coils 139 (FIG. 9) of the portable system are configured to mimic as closely as possible the performance of the corresponding array in the fixed system. FIG. 9 shows a set of transmitter coils which are suitable for use with the receive coils of FIG. 10. Both of the coil sets of FIGS. 9 and 10 can be separated along the horizontal bisector 131 for transport.

The two long vertical coils S-U and T-V of FIG. 10 are broken at the half-height mark into four shorter coils and are connected so that the coils in the upper panel 143 carry current in the same sense as the coils immediately below them in the lower excitation panel 145. The smaller, switched coils 204 and 146 of FIG. 9 and their controlling switches are fully contained within the lower panel 145. The coils of FIG. 10 are preamplified and connected to the remaining receiver electronics in a manner similar to the arrangement of FIG. 8. Similarly, the coils of FIG. 9 are connected externally and switched in a manner similar to the coils of FIG. 11. Connections between upper and lower panels are provided by extra cables that bridge the half-height gap.

In the design of a metal detector, it is important to consider the interaction of the transmit and receive coil arrays very carefully, since the sensitivity to metal objects and noise ultimately is determined by the complex interaction of excitation of the contraband object and the reception of resulting signals.

Performance is determined not only by the strength of the excitation field, or by the effective sensitivity field of the receive coil, or even by the product of the two strengths. The signal induced in the receive coil by an object at a given point, oriented in a certain direction, is calculated by a series of vector operations. First, the magnetic excitation field (a three-dimensional vector) set up by the excitation coil is calculated at the location of interest. Next, the sensitivity field of the receive coil is calculated for the point of interest. The sensitivity field is a vector field, calculated from the receive coil geometry by exactly the same algorithm that is used to calculate the excitation field of the transmitter coil.

Next, the excitation field is rotated and attenuated by a tensor characterizing the contraband object at that location and orientation. The resulting induced signal is a scalar number which is derived by taking the inner ("dot") product of the rotated excitation vector with the sensitivity field. To complicate matters further, the important criterion is not the sensitivity at one point, but rather the absolute maximum sensitivity that an object encounters while being carried in a normal path (a straight line in the walking direction, with constant orientation) through the detector.

After calculating these maxima for all orientations and paths of interest, the sensitivity of the design is measured by the smallest maximum. The ability to discriminate among objects on the basis of signal strength is measured by the ratio of the largest maximum to the smallest maximum.

Elder et al. (U.S. Pat. No. 3,697,996) also recognize and specifically address the problem of obtaining uniformly high sensitivity, regardless of the orientation of the contraband object. However, as with Aittoniemi, supra, they failed to teach a specific algorithm for calculating the effectiveness of a given array in addressing the orientation-dependence issue. Susman et al. (U.S. Pat. No. 3,758,849) produced a design that fails substantially to address orientation-dependence issues.

The problem of detector coil array design is complex. A full representation of the sensitivity properties of a metal detector would involve a six-dimensional description. Cross sections or projections can reduce the problem to five dimensions, but important information will already have been lost. Some conceptual simplification may be achieved by regarding the target object as a sphere or other isotropic shape coupled into the field independently of orientation. Then, at least, the tensor operation need not be considered.

Several considerations have constrained the design of these coil systems, as follows:

1. Optimizing performance of the first and second embodiments for isotropic objects pays a penalty since the detector becomes relatively less sensitive to highly anisotropic objects such as screwdrivers and knives, although pistols are more nearly isotropic. In the following discussions, the term "sensitivity" is used to mean "sensitivity to isotropic objects passing through the detector."

2. Use of coplanar construction minimizes manufacturing costs.

3. The receive coils should have vanishing dipole and quadrupole moments in order to minimize noise pickup.

4. Explicit consideration must be given to the field distortions caused by metal near or in the floor.

5. Hot spots are to be avoided by distributing the excitation or transmit and receive coil windings rather than by bundling parallel wire courses.

Hot spots come about when the field of one coil array (transmit or receive) is unusually strong in a given location, while the field of the other coil is at some typical value for that distance. Hot spots arise because the field strength induced by a current in a wire bundle falls off as 1/Radius. If the wires making up a coil are brought together into a tight bundle, the resulting field is quite large at a small radial distance from that bundle. In this zone, an extreme sensitivity occurs.

Figure 14:
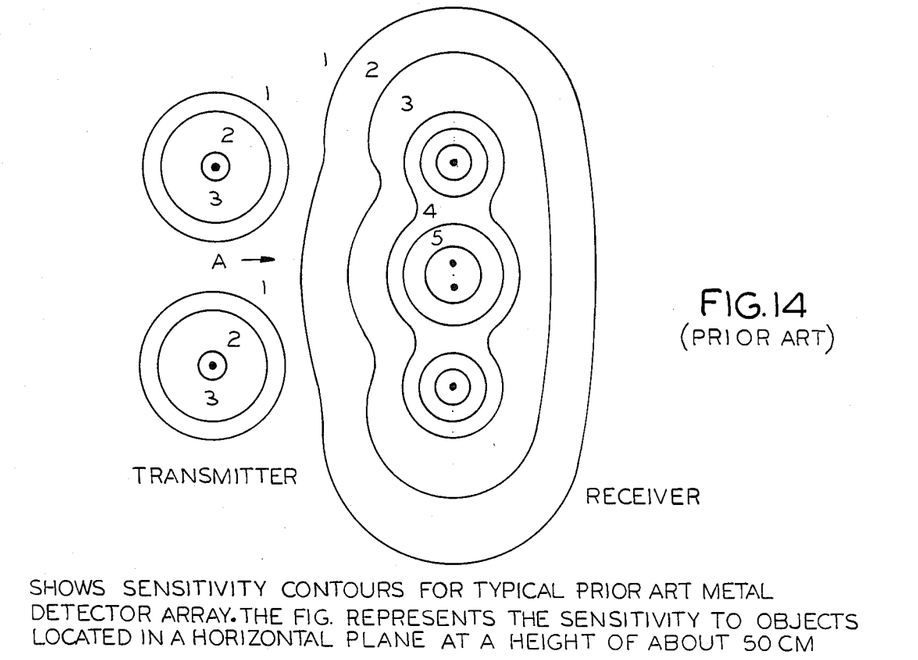
FIG. 14 is a graphical showing of the sensitivity contours of a metal detection field for a prior art metal detector array, wherein the field indicates the sensitivity contours to objects which may be located in a horizontal plane at approximately knee to waist height.
Figure 15:
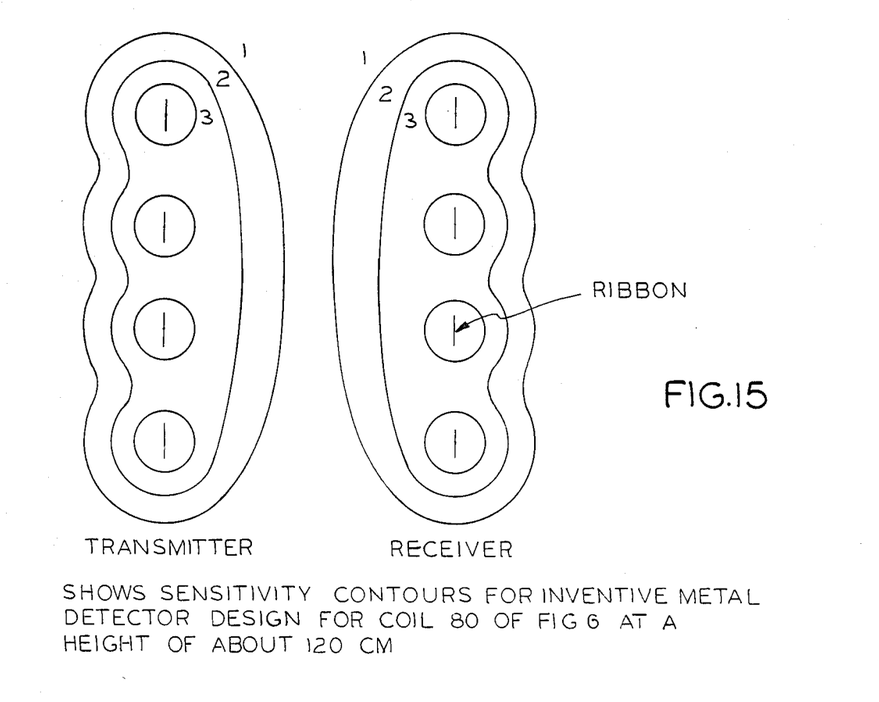
FIG. 15 is a similar graphical showing of the sensitivity contours for the inventive detector design at a similar height.

FIG. 14 shows sensitivity contours within a horizontal plane in a prior art coil array. Data are normalized so that the weakest path has unit sensitivity. There is a lopsided sensitivity pattern, with sizeable hot regions at or near the receiver panel. Compare FIG. 14 to FIG. 15. Due in part to the separation of the central wire bundles into two ribbons, the central hot spot on the receiver side has been reduced by a factor of about two. Meanwhile, a change of the transmitter coil from a dipole (single coil) to a quadrupole configuration has yielded a more symmetrical left-right sensitivity profile. This further reduces the hot spots. Depending on where one measures the hot spots, an improvement between 3:1 and 9:1 has been achieved.

Figure 16:
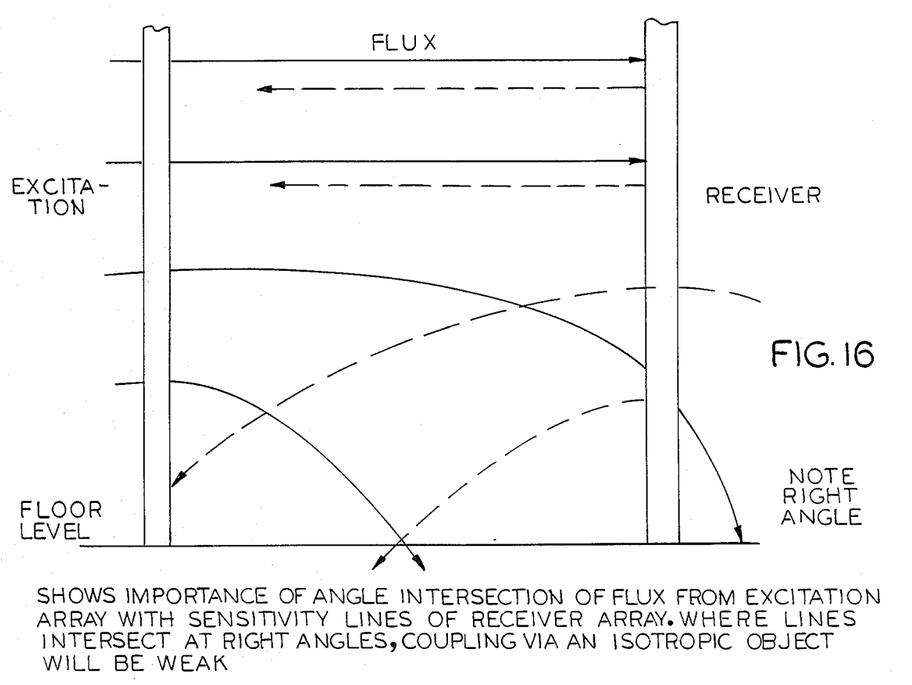
FIG. 16 graphically shows the importance of the angle of intersection of the flux from the excitation array with the sensitivity lines of the receiver array.

Sensitivity at floor level is a persistent and difficult problem in metal detector design. For mechanical and esthetic reasons, it is not practical to include excitation or sensor coils in the plane of the floor surface. On the other hand, if no coils are placed there, the fields diverge in a way that is difficult to control. In particular, flux vectors from transmit and receive coils may be at right angles to one another at floor level and near the center of the array. There is a resulting zero sensitivity for an isotropic object, as shown in FIG. 16. Furthermore, the variable composition of the many floors, ranging from wood to aluminum sheet to steel pan, etc., makes a universally optimal design completely impossible.

One frequently used approach to the floor problem is to require that an aluminum sheet about one-meter square be placed on the floor 44 under the detector, as shown in FIG. 1. This sheet standardizes the environment and confines rapid magnetic flux changes to the volume above the floor 44. Flux lines diverge less rapidly and are confined to directions in a horizontal plane; and thus transmit and receive fields intersect at oblique angles, permitting detection of isotropic objects. A beneficial side effect is the attenuation of interference signals from below floor level.

Figure 11:
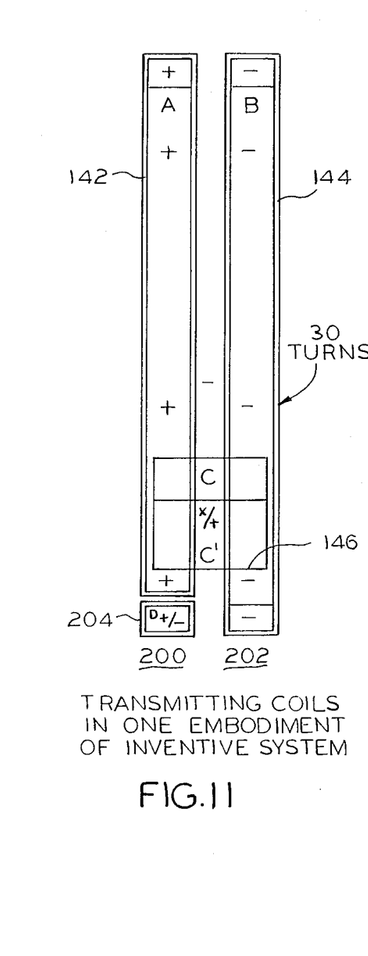
FIG. 11 shows the orientation of the transmitting coils in another embodiment of the inventive system.
Figures 12A, 12B:
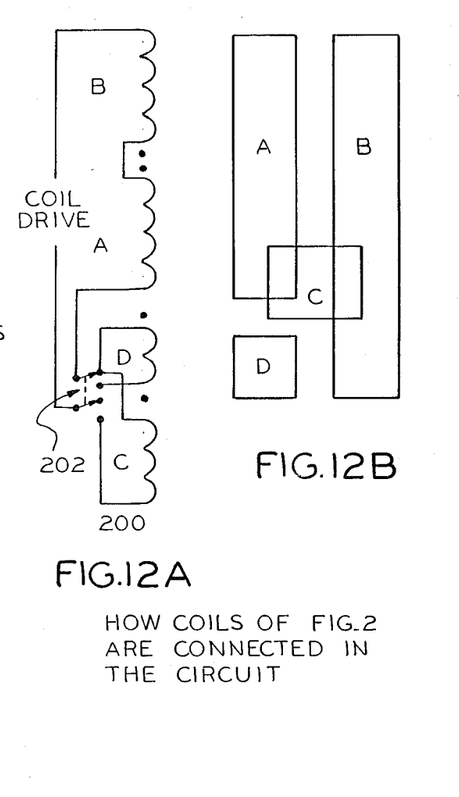
FIGS. 12A, 12B show how the coils of FIG. 11 are coupled into a circuit.
Figure 13:
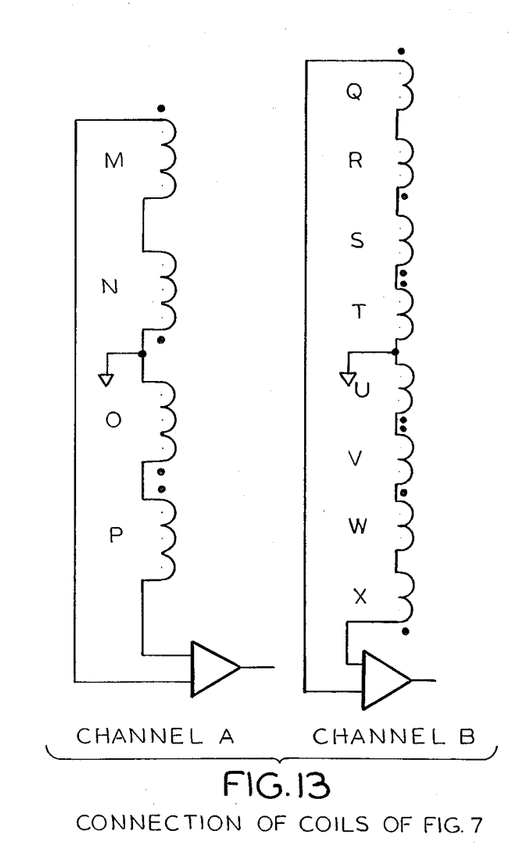
FIG. 13 schematically shows the connection of the coils defining the two channels of FIG. 10.

Another popular approach to the floor-level divergence problem is to use floor-level booster coils. These coils have extra turns of wire near floor level, wound in the same sense that the coils which they overlap are wound. The extra turns offset the natural weakening of the field at the ends of the coils, and also change the angle of intersection of the transmit and receive fields, so that an isotropic object may be seen more readily. The problem at floor level is not only one of field intensity, but also is one of direction. Therefore, there is a need for fine-tuning the field direction at floor level. This is done in the present designs by adjustments of the excitation or transmitter coil. FIG. 12A shows the preferred transmit coil set 200 in the inventive system. A panel along one side of the passage or portal 30 of FIG. 1 houses several coils. Coils A and B are mounted side-by-side with a gap along a vertical bisector. The letters "A" through "D" within the perimeter identify the individual coils of the coil set. FIG. 11 shows the phasing of the electromagnetic field which appears as a voltage which is impressed on the coils. FIG. 11 shows only one polarity, whereas the practice is to alternate the drive voltage in opposite polarities in order to invert the field sense. Reversing the coil voltage reverses the field and the polarity signs are only a convention in FIG. 11.

Double-pole switch 202 in FIG. 12A is shown as one way to alter the coil arrangement and phasing, although other methods including solid state switches may be employed within the spirit of this invention. The coils of FIG. 11 may be connected to produce the correct phase relationship in this preferred embodiment. There is an increased parallelism at floor level when a trimmer winding 204 is added, as shown in FIG. 11. The trimmer winding may create problems at higher levels, but those problems are not difficult to address. This invention has two switched options for use with, or without an aluminum or non-magnetic floor shield.

The excitation or transmit coil is represented in FIG. 11, where the coil elements are connected in series. A "+" symbol indicates that the current is in a clockwise direction, and a "−" indicates counterclockwise flow. An "x" indicates "not in circuit". If two symbols appear, as in "±", it means that the path is clockwise for the aluminum floor shield option and counterclockwise for the trimmer option. As with the receive coil, the windings are uniformly distributed rather than being bound in bundles, and for similar reasons. The vertical wire paths are spaced 1:1:1 in order to minimize hot spots. Ribbon cable is difficult to use here, both because of the currents involved and because of the large number of splices that would be required by the switched options. The spreading of current paths is achieved by separating each conductor group into two loose bundles, separated by approximately 3 cm.

FIG. 12A shows the phasing connections for the coils of FIG. 11, with conventional transformer dot marks being used to show phase relationships. Coils A, B and D are in-circuit at all times. When coil D is connected clockwise (switch 202), the left-hand coil subset is an electrical mirror image of the right-hand subset. The set comprises a quadrupole. When in the dipole mode, coils C and D are connected in series, with opposing senses. The effect is a change in the shape of the illuminating field within the portal area.

When connected for operation over an aluminum floor shield 44 (FIG. 1), the coil set is a quadrupole, and coil C is not in the circuit. When set up for operation over nonconductors or steel, the coil set is chiefly quadrupolar, but contains a dipolar element at floor level. The dipole mode is used over heavy metal flooring, because the iron in the floor distorts the flux across the bottom-most portion of the detector. The dipole effectively changes the curvature of the resulting field to compensate for the presence of large amounts of steel in the flooring. It also reduces interference as mentioned above.

When set up for use with an aluminum floor shield, the coils amount to an elongated quadrupole with booster coils at the ends. Such a pattern has been used before, for instance in the Del Norte HS series detectors. When set up for use without an aluminum floor shield, the small floor-level coil D is reversed in sense relative to the coil A above it and coincides in sense with the coil B beside it. In effect, the quadrupole has been truncated and a dipole has been put in place of the portion that was removed. In order to better control the field direction at floor level, coil C is included. It offsets a portion of the floor-level dipole, forming with it a quadrupole, and raising the angle of intersection of the excitation flux lines with the floor, so as not to intersect at right angles with sensitivity vectors of the receiver coil. Since the truncated quadrupole is also in operation here, the true field patterns are quite complex.

A beneficial side effect comes about as a result of having a dipolar excitation at floor level. When massive amounts of steel are in the floor (i.e., a steel pan is under concrete), there can be a nonlinear coupling between the excitation field and external hum signals, mediated by the magnetic hysteresis of the steel. The resultant signals may contain significant components at the metal signal frequency, increasing sensitivity to external noise. If the quadrupole extends to the floor, these hysteresis effects appear in the proper sense to be detected by the lower receiver coil of FIG. 6. If the excitation at floor level is dipolar, the noise is still aliased, but it appears in equal and opposite senses in the two halves of the receiver coil. Hence, the noise is not perceived by the electronics.

Due to the use of quadrupolar transmit coils and octopolar receiver coils, the sensitivity of the detector to external moving metal objects drops rapidly to an insignificant level at a typical distance of approximately 0.4 meters on the excitation side and approximately 0.6 meters on the receiving side. If a better performance is required, the receiver-side range may be reduced to about 0.4 meters. This is done by adding a vertical fin at the center of the receive coil assembly, the fin being outside the sample space. A coil having two turns of wire is installed in the fin and connected in series with the excitation coils in the proper sense. The coil extends from the floor to the top of the assembly, and the width of approximately 8 cm is adjusted empirically as a function of height to minimize response to external objects passing by. This arrangement works because the excitation field, which extends beyond the receiver coil plane, is substantially reduced outside the detector by the field of the coil in the fin. Inside the detector, the excitation field is relatively large and so is not significantly affected by the fin.

Some applications require coil panels which are much narrower than the arrays described above. Such applications include "mantrap" or synchronous access systems, where the coils must stand within a rather small enclosure and not interfere significantly with a guard's view of the person being scanned. For example, a preferred coil set is about 25 meters wide by 1.5 meters high.

Furthermore, it is desirable to detect highly anisotropic weapons such as switchblades. Such a detection requires a more diverse field arrangement than that described above.

Prior art references relating to metal detectors have used narrow coil arrays for walk-through metal detectors. These narrow coils are sensitive in most areas and have some field diversity. The system of Attoniemi's patent, supra, goes far toward full field diversity, but it is wide and has a rather poor ratio of hot-to-weak spot sensitivity. Furthermore, it does not reject noise very well because of what appears to be the appreciable dipole and quadrupole moments of the receive coils.

The inventive detector provides a compact array that has a more uniform sensitivity to anisotropic objects and a better rejection of external noise.

1. The metal environment is variable and uncontrolled, particularly at the floor and top levels. The design should be relatively insensitive to both internal field distortions and noise field gradient distortions at floor and ceiling levels.

2. Any mutual coupling between the transmitter and receiver arrays should be minimized.

3. In order to minimize noise pickup, the dipole and quadrupole moments of the receiver coils should vanish.

means to sense highly

4. The design should provide means to sense highly anisotropic objects.

5. The ratio of maximum to minimum sensitivity in the active volume should be minimized.

The most probable effect of floor or ceiling metal on internal magnetic fields will be to bend the fields toward or away from a vertical direction, without significantly affecting the absolute magnitude of the field. Multiple transmitter and receiver coils are employed. The field patterns of transmitter pairs or receiver pairs intersect at right angles. A rotation of the pattern by environmental metal brings the field of one coil into alignment with a given object, even as the field of the second is rotated away from the proper alignment.

Due to the unpredictable nature of noise field distortions at floor level, one of the best ways to deal with the noise is to weaken the receiver array sensitivity at the ends of the array and to provide a complementary local increase in the excitation field strength. Also, the vertical size of the coils at the ends should be less than the size at the center in order to minimize close-in sensitivity to vertical field gradients.

The excitation coils may be disposed in an array that has a small vertical dimension and lower strength at the center, and that tends towards larger dimensions and higher field strength at the top and bottom. Such a coil can come close to satisfying both the orthogonality and the complementarity criteria.

Quadrupole and dipole receiver array moments are minimized by direct application of simultaneous equations to find arrays that satisfy the criterion. One coil is designed to be symmetrical about the vertical half-height, while the other is antisymmetrical. The coils are deployed to cover one another's weak spots. Meeting these criteria yields a coil set which produces fields that tend to intersect at right angles and meet the diversity criterion.

The transmitter coils are not strongly constrained as far as moments are concerned. The transmitter coils may be adjusted to minimize the variation of detection sensitivity.

Figure 17:
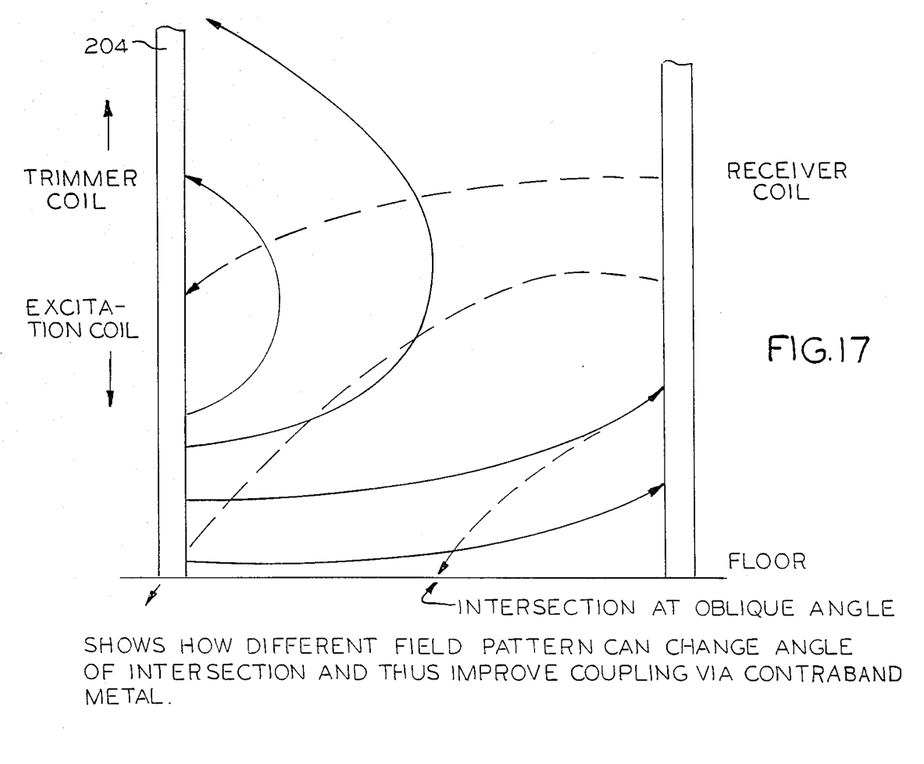
FIG. 17 is a similar graphical showing of how a different field pattern can change the angle of intersection and thus improve coupling via contraband metal.

The resulting array pattern is depicted in FIGS. 16 and 17. Since the invention uses ribbon cables to construct the receiver coil array, it is limited to an integer number of loops of ribbon in each coil. To avoid hot spots, the integer must be small. Hence, the vertical height of the receiver coils is the only continuously variable parameter and is constrained to keep the low-order moments down.

The transmitter coil array is somewhat freer in design, but must respond to the constraints on the receiver array by having greater strength at the ends.

Changing the number of coils in the transmitter or receiver arrays by one or two units produces only minor effects on the performance of the system, provided the same design rules are observed.

In order to assure minimum dependence on the orientation of a contraband object, each receiver system must respond independently to signals induced by either of the transmitter coils of FIG. 17.

Those who are skilled in the art will readily perceive various modifications in the described structure. Therefore, the appended claims should be construed to cover all equivalent structures which fall within the true scope and spirit of the invention.

I claim:

1. A walk-through, person-screening metal detector comprising bistatic coil means in a portal with transmitting coil means on one side and receiving coil means on the opposite side of the portal, said transmitting coil means being multiple coils and having changeable interconnection means for changing a field pattern in local regions of the portal to compensate for the effects of adjacent metal near t portal, and with gaps between adjacent parts of said multiple coils for adjustably controlling sensitivity variations within a volume contained by the receiving coil means disposed on said portal to intercept a field induced in a contraband item by the transmit coil means, detector means coupled to said coils, and alarm means responsive to said detector means for reporting contraband metal passing the portal.

2. The metal detector of claim 1 wherein said multiple coils comprise a plurality of spacially separated wires embedded in plastic and radially disposed for reducing time constants and balancing displacement currents, said wires being held in alignment at fixed radial distances from one another by a common matrix of insulation, applied before said multiple coils are formed from said wires.

3. The metal detector of claim 1 and connector cables joining said receiving coil means, and balanced preamplifier means at leakage terminals of said coil means at leakage terminals of said coil means for reducing the effect of noise leakage induced in said connector cables before signals picked up by said receiving coil means reach associated receiver electronics.

4. The detector of claim 1 and switch means for reconfiguring the coils to adjust performance when different amounts and kinds of metal are encountered adjacent said detector, said switch means changing an effective pattern of sensitivity by altering intersecting angles of flux produced by said transmitting coil means and received by said receiving coil means for reducing the effects of adjacent metals.

5. A coil array for a walk-through, pulsed-field metal detector, said array comprising:
   a. first receiver coil means having four loops of conductor material, constructed from a ribbon cable with no dipolar or quadrupolar moment, and with gaps between conductors of adjacent coils;
   b. second receiver coil means constructed similar to and inverted with respect to said first receiver coils;
   c. said first and second coils being aligned so that the least sensitive zone of said first coil coincides with the most sensitive zone of the second coil and vice versa.

6. The coil array of claim 5 and transmitting coil means comprising four coils with significant gaps between the coils, and means for interconnecting said coils to fill in said gaps between conductors of adjacent coils.

7. The coil array of claim 5 wherein said coils are constructed from flat ribbon conductors.

8. The coil array of claim 5 and means for forming said coils from conductors which are held in a spaced parallel arrangement.

9. The coil array of claim 8 and preamplifier means closely adjacent said coils for amplifying signals picked up by said receive coils before external effects act upon said picked up signals.

10. The coil array of claim 8 and means for packaging said coils in a plurality of separate panels which may be disassembled for shipment.

11. The coil array of claim 8 wherein said conductors form five vertically distributed loops coupled to have no dipolar or quadrupolar moment.

12. The coil array of claim 8, wherein said conductors form at least three vertically distributed loops coupled to have no dipolar or quadrupolar moment.

* * * * *